Feb. 9, 1932.  H. H. BOYCE  1,844,055
MOTOR HEAT INDICATOR
Original Filed Oct. 9, 1930
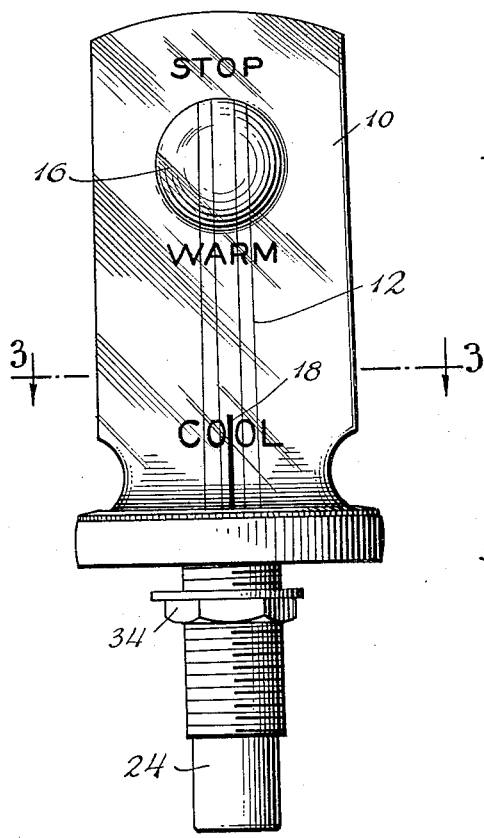
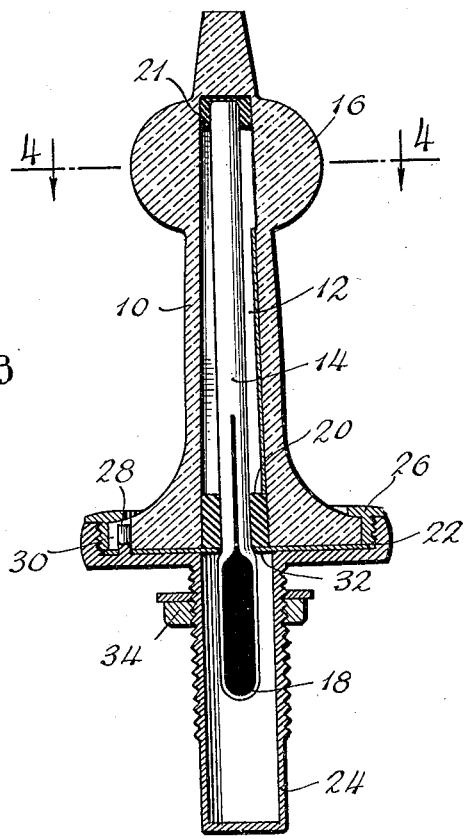
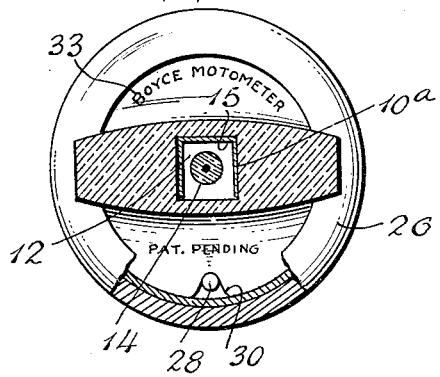
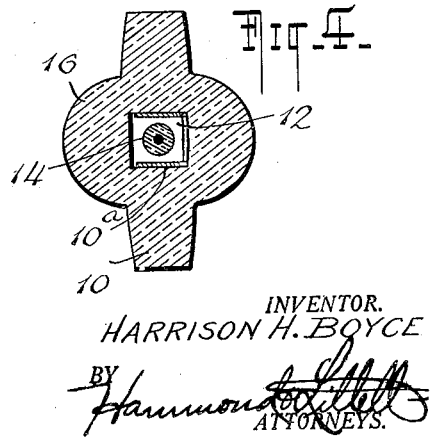
INVENTOR.
HARRISON H. BOYCE Patented Feb. 9, 1932

1,844,055

UNITED STATES PATENT OFFICE

HARRISON HURLBERT BOYCE, OF NEW YORK, N. Y.

MOTOR HEAT INDICATOR

Continuation of application Serial No. 487,385, filed October 9, 1930. This application filed December 9, 1930. Serial No. 500,990.

This invention relates in general to devices for indicating the heat condition within the cooling system of the automotive internal combustion engines mounted on a radiator cap and particularly relates to an improved housing for the indicating element, this application being a continuation of my copending application Ser. No. 487,385, filed October 9th, 1930.

One of the principal objects of this invention is to provide a transparent housing of glass or the like of simplified plate form extending above the radiator cap which is secured to the radiator cap in a secure and rigid manner and which is provided with a central flat sided bore into which the indicating device extends and through which the indicating element may be observed without a reducing distortion.

Another object of this invention is to provide novel means for attaching an all glass heat indicating housing to a metal or bakelite radiator cap which will be simple in construction and ornamental in appearance.

Another object of this invention is to provide a glass motor heat indicator housing for a heat indicator connected in such a way as to facilitate the manufacture of the glass housing and whereby the indication of the heat indicator will be more completely preserved and whereby the assembly of all the parts will be facilitated.

Another object of this invention is to provide a plate glass housing for a motor heat indicator which is provided with a central bore having flat faces, rectangular or polygonal in cross section whereby the line of vision of the operator will pass through a flat face adjacent the indicating column and will be undistorted.

Another object of this invention is to provide a plate glass housing for a motor heat indicator in which the usual distortion present with cylindrical bores is obviated.

Further objects and advantages of this invention will become apparent from the specification, claims and the appended drawings in which:

Figure 1 is a side elevation of a motor heat indicator having an all plate glass housing.

Figure 2 is a vertical cross section at right angles to Figure 1 and substantially on the center line thereof.

Figures 3 and 4 are horizontal sections on the line 3—3 and 4—4 of Figures 1 and 2 respectively.

In my copending application there is disclosed a type of motor heat indicator having a one piece glass housing structure for the heat indicator element and which is provided with a central bore into which the indicating element is inserted. When in such constructions of motor heat indicators the interior surface of the bore is curved, a certain distortion is brought about and the housing acts as a reducing lens with respect to the indicating column.

My present device consists essentially of a glass housing 10 which is provided with a central bore 12 which as shown in Figures 3 and 4 is provided with flat sides 10a. The sides 10a may preferably be the sides of a square in cross section offering a flat surface through which the indicating stem 14 is observed. The lens elements 16 are placed adjacent the danger zone of the indicating column only, and magnify this range of indication. The indicating stem 14 is preferably filled with an indicating fluid 18 which is responsive to heat and which rises in the indicating stem 14 in a well known manner. When the heat condition is such that the liquid 18 reaches substantially the top of the column 14 a danger zone is said to have been reached and the lens 16 acts to concentrate the light rays and to magnify the reading so that the danger condition may be instantly noticed. A reflector 15 which may be of paper or metal is preferable as a backing for the stem 14 and aids to make the indication more vivid and distinct.

As will be noted in Figure 1, the indicating column of liquid 18 is visible from the front or operator's side and the operator is usually observant of the column in the lower range which is the usual heat condition within the radiator, not shown, to which the motor heat indicator 10 is affixed. As the bore has a flat side in this line of vision and as the surface on the outside of the housing 10 is also substantially flat, the column of liquid 18 will appear in its true size rather than reduced as is the case if a curved or cylindrical bore were provided. The indication of liquid 18 is thus not only its true size but is always uniform whether viewed from one angular position or another and the full width of the indicating column can be read from the operator's position. If the column of liquid reaches the danger zone, the lens 16 acts to magnify the reading.

In order to mount the indicating stem 14 within the casing 16, rubber gaskets 20 and 21 are provided which closely fit the central bore 12 cooperating with the flat sides thereof and centrally supporting the indicating stem 14 so that the stem will be held in its fixed position and will not be jarred loose. A supporting member 22 which may preferably be made of metal and provided with a guard or shank 24 to protect the heat responsive end of the indicating element is secured to the housing 10 by means of a split ring 26. The ring 26 which is smaller than the housing 10 is split in order that it may be assembled over the housing 10 and fitted into place within the angular edge of the supporting member 22. The projection 28 on the supporting member 22 is provided to cooperate with the depression 30 in the base of the housing 10 so that the housing will not turn relative to the supporting member 22. A spacing member or gasket 32 is positioned between the glass housing 10 and the metallic supporting member 22 in order that the housing may be forced tightly into contact with the supporting member without injury to the glass. The gasket 32 may be provided with patent markings or other information 33 which material can be observed through the transparent base of the all glass housing 10. A suitable nut 34 on the guard 24 is provided for affixing the motor heat indicating housing to a radiator cap, not shown.

Although the flat surface of the bore is shown as a side of a square, other flat surfaces could be used for the interior of the housing and the cross sections may be a triangle or other polygons which would vary the width of the flat side. To insure the best vision and to reduce distortion when the indicating stem is viewed from the front of an all glass type housing, the full flat surface provided by the square shaped aperture is preferable. Such an aperture may be formed by molding or in any desired manner. It may be provided with the reflector 15 is shown or it may be otherwise treated to give an opaque background.

The reflector 15 is desirably U shape throughout its major length as is shown in Figure 2 and Figure 3. At the top, however, the back of the reflector 15 is removed as shown in Figure 4 in order that the light which comes through the lens 16 may be focused on the column of liquid 18 to thus indicate the danger condition. The lens 16 in the line of vision of the operator's eye magnifies the reading and due to the light concentrated on the liquid column by the lens 16 on the opposite side of the motor heat indicator housing, the movement of the liquid 18 in the range of the lens members 16 will be doubly noticeable.

The sides of the reflector 15 extend to the top of the aperture 12, however, in order to space the reflector in the aperture and to prevent its vertical movement while the sides of the reflector prevent lateral movement.

The manner by which the housing is secured to the supporting member may be varied, it being understood that it is desirable to so affix the housing to the supporting member that when the supporting member is secured to the radiator cap and the cap is screwed tight, the housing will be turned to the same position each time. The advantages of the split ring are that a larger housing may be provided with a relatively small supporting member and the motor heat indicator not only has the advantages of utility, ease of reading and simplicity in construction but it is also ornamental and of attractive appearance.

While I have shown a preferred form of embodiment of my device, I am aware that other modifications may be made therein and I therefore desire a broad interpretation of my device within the scope and spirit thereof and of the claims appended hereinafter.

I claim:

1. In a device for indicating the heat condition within an automotive radiator, an all glass housing member having a central aperture therein and a flared base, said aperture having flat sides throughout the line of vision, a heat responsive element mounted within said housing member, means to secure said heat responsive element within said housing member, said means including a supporting member and a split ring surrounding said flared base and secured to said supporting member, and means to prevent rotation of said housing member with respect to said support whereby an alignment of said flat sided aperture and said heat responsive element may be maintained.

2. A motor heat indicator of the class described, the combination with a one piece solid glass housing, a supporting member, means to secure said supporting member to said housing, said housing having a central aperture, said supporting member cooperating to secure said indicating stem within said aperture, said aperture having a plurality of flat sides, one of which is within the line of vision whereby the true width of the indicating stem may be observed.

3. A motor heat indicator of the class described, an all glass housing having a base, a supporting member for securing said indicator to a radiator cap, and a gasket mounted between said base and said supporting member, and printed matter on said gasket observable through said base.

4. A motor heat indicator of the class described, an all glass housing having a base, a supporting member for securing said indicator to a radiator cap, and a gasket mounted between said base and said supporting member, and printed matter on said gasket observable through said base, said housing having a central bore having flat sides, a heat responsive element mounted in said housing and means within said bore adapted to facilitate reading of said element.

5. A motor heat indicator as claimed in claim 4, in which the cross section through said central bore is a square.

6. A motor heat indicator having an all glass housing with a flat sided central aperture therein, a plurality of lens adjacent the top of said housing, said housing adapted to receive a heat indicating device which may be observed through said lens, and a reflector fitting within said aperture to emphasize the readings of said heat indicating device.

7. A motor heat indicator as claimed in claim 6 in which a part of the reflector is broken away adjacent the lens element.

In testimony whereof I have affixed my signature to this specification.

HARRISON H. BOYCE.